Aug. 12, 1947.  T. W. URBAN  2,425,658
FISH LURE
Filed Sept. 12, 1945
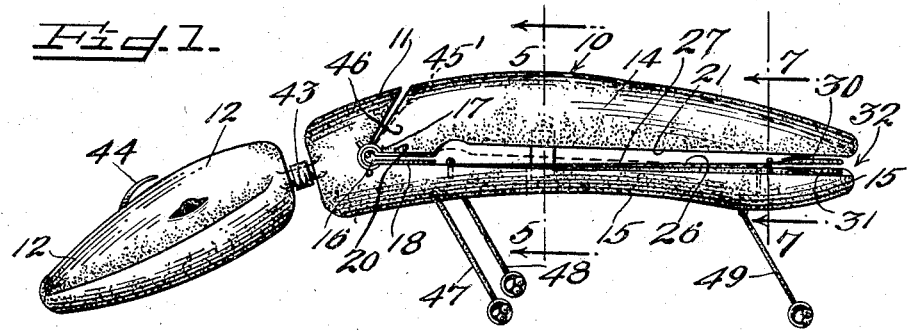
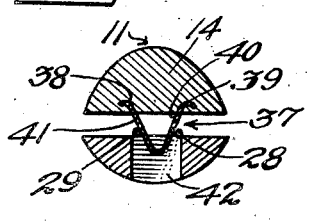
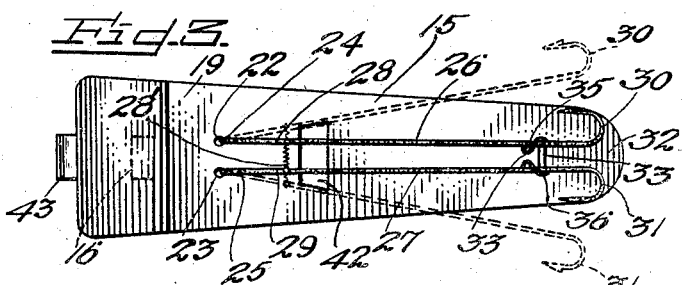
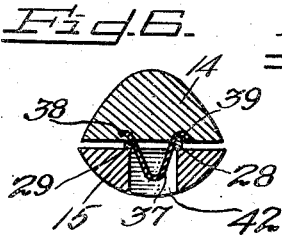
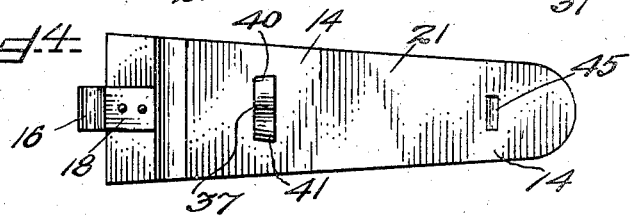
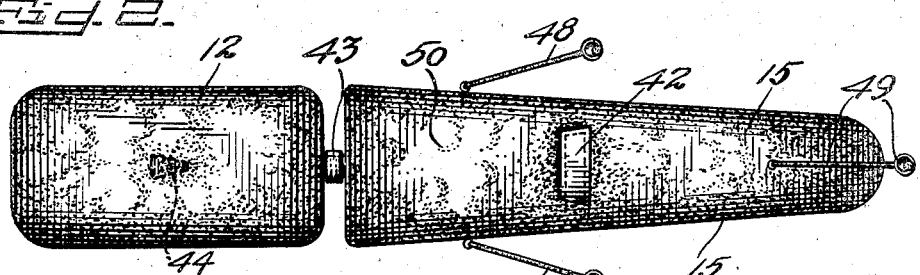
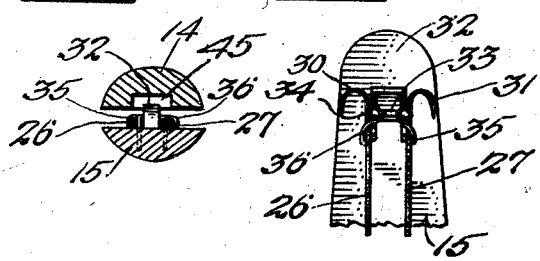
Inventor
THOMAS W. URBAN,
By Clarence A. O'Brien
and Harvey B. Jacobson
Attorneys Patented Aug. 12, 1947

2,425,658

UNITED STATES PATENT OFFICE 2,425,658

FISH LURE

Thomas W. Urban, Detroit, Mich., assignor of forty-five per cent to Carrol E. Urban, Detroit, Mich.

Application September 12, 1945, Serial No. 615,824

5 Claims. (Cl. 43—35)

My invention relates to fishermen's tackle and has for its object to provide a lure within which spring actuated hooks are held hidden.

A further object of this invention is to provide a lure formed in two hingedly connected sections between which fish hooks are normally held concealed, but which upon a strike or grab by a fish will be automatically thrown out and into the jaws of the fish.

Another object of the invention is to provide a fish lure having a concealed hook or hooks adapted to be thrown outwardly of the lure through the grabbing of the lure by a fish.

Other features and advantages will become more readily apparent from the following description and the accompanying illustrative drawings in which:

Figure 1 is a side elevational view of my lure,

Figure 2 is a bottom plan view of the device,

Figure 3 is a top plan view of a bottom section of the lure,

Figure 4 is a bottom plan view of another section of the device,

Figure 5 is a section on line 5—5 of Figure 1,

Figure 6 is a similar view showing the parts in changed relation,

Figure 7 is a section on line 7—7 of Figure 1, and

Figure 8 is a detail of a hook rest and friction retainer.

The same reference characters applied to the various elements in the above drawings are used to denote the same parts throughout the specification to follow.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claims. And while I have stated the primary field of utility of my invention it remains obvious that it may be employed in any other capacity wherein it may be found applicable.

It is a well known fact that practically any game fish grabs its bait from the rear end thereof, holds it a while in its mouth and then throws it out in a manner that enables it to swallow the bait head first, therefore I have designed the herein disclosed lure for game fish bearing this fact in mind.

In the drawings 10 indicates my improved lure which consists of a body 11, to which is preferably hinged a head 12, which members may be formed to simulate any desired bait attractive to the particular game fish being angled for. The said body is formed in two sections 14 and 15, the top section 14, being hinged at 16, to the bottom section 15, and a leaf spring 17, doubled upon itself around the said hinge member and having its arm 18, bearing upon the inner surface 19, of the section 15, and its arm 20, bearing against the inner surface 21, of the upper section 14, whereby said sections are normally spread slightly apart, the tension of said spring being such as to hold said members 14 and 15, spaced only as required.

Eyes 22 and 23, are provided on said surface 19, to which the eye terminals 24 and 25, of fish hooks 26 and 27, are pivotally attached. The end portions 28 and 29, of the fish hook shanks are connected by a coil spring wire 28' the tension of which is just sufficient to draw the hook terminals 30 and 31, within the confines of the tail end 32, of said body, adjacent which end is provided a staple or other stop 33, against which said hook shanks normally seat. A spring wire 34, is secured to the stop, the opposed arcuate terminals 35 and 36, of which are bent so as to frictionally bear upon the shanks of the fish hooks but from which the hooks may readily release themselves in a manner now to be explained. The section 14, of the lure is provided with a V-shaped member 37, the parts 38 and 39, of which are secured in or to the under surface 21, of said section. When in normal raised position the sides 40 and 41, of the V-member project just far enough into the aperture 42, through body section 15, to permit the shanks 28 and 29, to bear thereagainst when in closed position, but when a fish strikes the bait and presses its sections 14 and 15, together against the tension of spring 17, the said V-member will be driven down into said aperture, thereby throwing the hook ends 30 and 31, outwardly of their concealed position and into the mouth of the fish (see dotted lines of Figure 3), whereupon a tug against the fishing line to which the lure is attached, by either the fish or its captor, will cause the hooks to embed themselves securely in the mouth of the fish.

Figures 5 and 7 of the drawings illustrate respectively the set and sprung positions of the fish hook actuating member 37.

The head 12, is hinged at 43, to the body of the lure and is provided with an eye 44, whereby it may be attached to a fishing line. A recess 45, is provided in the under surface 21, of the body section 14, into which the stop 33, may project when said member 14, is pressed down. The inner portion 45', of the end 46, of body section 13, is slightly hollowed out to permit said section to be raised sufficiently to reset the hooks. It is obvious that the arms 18 and 20, of the spring 17, may be secured to their respective surfaces 19 and 21, of said sections 14 and 15, to hold them in normal set position. Rotatable spinner members 47, 48 and 49, are attached to and depend from the under surface 50, of the said body 11, and rotate as the lure is drawn through the water. The spinners comprise enlarged elements supported at the outer ends of arms whose inner ends are secured to the undersurface 50 of the body 11 in any desired manner, whereby the outer elements of the spinners will be caused to spin due to the action of the water upon their outer surfaces as said lure is drawn through the water.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention, that which I claim as new and desire to procure by Letters Patent is:

1. A lure comprising a body formed of a pair of interconnected sections, fish hooks pivotally connected within the confines of the body, means for holding the said sections normally spaced, means for throwing the hooks outwardly of the body upon closing said sections upon one another, spacers for the hooks, one of the spacers being said second means, said second means consisting of a V-shaped member on one of said sections, the other section having a recess of receive the V-member, means for drawing the hooks within said confines, and friction members for said hooks.

2. A lure comprising a body formed of a pair of interconnected sections, fish hooks pivotally connected within the confines of the body, means for holding the said sections normally spaced, means for throwing the hooks outwardly of the body upon closing said sections upon one another, spacers for the hooks, one of the spacers being said second means, said second means consisting of a V-shaped member on one of said sections, the other section having a recess to receive the V-member, and means for drawing the hooks within said confines.

3. A lure comprising a body formed of a pair of interconnected sections, fish hooks pivotally connected within the confines of the body, means for holding the said sections normally spaced, means for throwing the hooks outwardly of the body upon closing said sections upon one another, spacers for the hooks, one of the spacers being said second means, said second means consisting of a V-shaped member on one of said sections, and the other section having a recess to receive the V-member.

4. A lure comprising a body formed of a pair of interconnected sections, fish hooks pivotally connected within the confines of the body, means for holding the said sections normally spaced, means for throwing the hooks outwardly of the body upon closing said sections upon one another, spacers for the hooks, one of the spacers being said second means, and said second means consisting of a V-shaped member on one of said sections.

5. A lure comprising a body formed of a pair of interconnected sections, fish hooks pivotally connected within the confines of the body, means for holding the said sections normally spaced, means for throwing the hooks outwardly of the body upon closing said sections upon one another, spacers for the hooks, and one of the spacers being said second means.

THOMAS W. URBAN.

REFERENCES CITED

The following references are of record in the file of this patent:

UNITED STATES PATENTS

| Number | Name | Date |
| --- | --- | --- |
| 925,482 | Kahlo | June 22, 1909 |
| 1,557,644 | Andersen | Oct. 20, 1925 |
| 1,571,770 | Fenner | Feb. 2, 1926 |
| 2,256,088 | Hogan | Sept. 16, 1941 |